US007689679B2

(12) United States Patent
Hernandez et al.

(10) Patent No.: US 7,689,679 B2
(45) Date of Patent: Mar. 30, 2010

(54) METHOD TO ENABLE INFINIBAND NETWORK BOOTSTRAP

(75) Inventors: Carol B. Hernandez, Austin, TX (US);
Stephen D. Linam, Austin, TX (US);
John T. O'Quin, II, Austin, TX (US);
Mark W. Wenning, Cedar Park, TX (US)

(73) Assignee: International Business Machines Corporation, Armonk, NY (US)

( * ) Notice: Subject to any disclaimer, the term of this patent is extended or adjusted under 35 U.S.C. 154(b) by 463 days.

(21) Appl. No.: 11/678,124

(22) Filed: Feb. 23, 2007

(65) Prior Publication Data

US 2008/0209018 A1 Aug. 28, 2008

(51) Int. Cl.
*G06F 15/177* (2006.01)
(52) U.S. Cl. .......................................... 709/222; 713/2
(58) Field of Classification Search .................. 709/222
See application file for complete search history.

(56) References Cited

U.S. PATENT DOCUMENTS

| 6,895,590 | B2* | 5/2005 | Yadav ......................... 719/328 |
| 7,155,537 | B1* | 12/2006 | Weber et al. ................. 709/249 |
| 7,398,337 | B2* | 7/2008 | Arndt et al. .................... 710/37 |
| 2003/0126242 | A1* | 7/2003 | Chang ........................ 709/222 |
| 2003/0145045 | A1* | 7/2003 | Pellegrino et al. ........... 709/203 |
| 2003/0221042 | A1* | 11/2003 | Watkins et al. .............. 710/316 |
| 2004/0078679 | A1* | 4/2004 | Cagle et al. ................... 714/36 |
| 2006/0013251 | A1* | 1/2006 | Hufferd ....................... 370/466 |
| 2006/0205388 | A1* | 9/2006 | Semple et al. .............. 455/411 |
| 2006/0251257 | A1* | 11/2006 | Haverinen et al. .......... 380/270 |
| 2007/0204103 | A1* | 8/2007 | Wilkinson et al. .......... 711/114 |

* cited by examiner

*Primary Examiner*—Quang N. Nguyen
*Assistant Examiner*—Kostas Katsikis
(74) *Attorney, Agent, or Firm*—Dillon & Yudell LLP (57) ABSTRACT

Firmware of an InfiniBand (IB) host computer device provides a representation of an IB Host Channel Adapter (HCA) within the hierarchical data structure during system initialization. An ib-boot support package encapsulates arguments for booting over an IB network using an ibport device. The ib-boot support package supports keywords identifying a network support package or a Sockets Direct Protocol (SDP) support package. When the first keyword is provided, the IPoIB network protocol is used to access the boot server and retrieve the boot file. When the second keyword is provided, the IB network boot method is implemented, whereby the SDP network protocol is used to access the boot device. Access to the boot server is thus provided via one of the support packages, and the boot image is returned to the host device via the IB network for completion of boot operations.

18 Claims, 6 Drawing Sheets

METHOD TO ENABLE INFINIBAND NETWORK BOOTSTRAP

RELATED APPLICATIONS

The present application is related to the subject matter of commonly assigned, co-pending U.S. patent applications: Ser. No. 11/678,116; Ser. No. 11/678,132; and Ser. No. 11/678,133. Relevant content of the above related applications are incorporated herein by reference.

BACKGROUND OF THE INVENTION

1. Technical Field

The present invention generally relates to computer systems and in particular to networked computer systems. Still more particularly, the present invention relates to remote network boot operations for computer systems.

2. Description of the Related Art

Network computer systems are generally known in the computer arts. Also known is the general method for loading a boot image/file of a computer system from a remote server located across a network utilizing the Trivial File Transfer Protocol (TFTP). In particular, when booting a computer system (i.e., a network device) over a network, such as a local area network (LAN), the computer system's firmware typically utilizes the TFTP bootstrap method to obtain the boot file from a boot server/device across the network.

With this TFTP bootstrap method, a network support package is provided to assist with the network boot operation. Specifically, the network support package utilizes the TFTP bootstrap method to retrieve and/or define specific boot arguments required to access and retrieve the boot image/file at the boot server. The network support package also processes the boot arguments obtained from the computer system and establishes a connection with the remote server to obtain the boot file. General information about the utilization of the network support package to enable loading of a boot image from a boot server located across a LAN via TFTP bootstrap may be found within Open Firmware Recommended Practice: TFTP Booting Extension Version 1.0, which is published by the Open Firmware Working Group.

While the above TFTP boot strap method is applied to and works well within standard LAN-based and other similarly configured networks, such methods have proven to not be effective with different network configurations or network-types. For example, the TFTP bootstrap method does not work with an InfiniBand (IB) network.

As is known in the art, an InfiniBand (IB) network is a packet-switched, narrow parallel network, operating at a high data rate and at a large physical range, to interconnect remote devices to a host computer system (or server). The IB network comprises a host channel adapter (HCA), which couples the host computer system to a subnet. The network further comprises one or more target channel adapters (TCAs), which in turn couple other devices to the subnet. The subnet typically includes at least one switch and a plurality of links that connect the HCA and the TCAs to the switch(es). As an example, a simple IB network may have one switch, to which the HCA and the TCAs connect through respective links.

IB networks are often connected to local or wide area communication networks via adapters and routers. For example, an Ethernet network adapter may be utilized to enable communication over an Ethernet network. The network adapter has its own TCA, serving as an end node within the IB network for coupling to the Ethernet network. The IB specification further provides a raw datagram mode of communication to bridge packets received from an Ethernet network for transmission over an IB network, and vice-versa. Similarly, IB networks may include routers or adapters to connect to the Internet.

Given the increasing reliance on remote boot operations to complete the booting of computer devices, and the growing complexity of new networks such as an IB network, there is a need for expanding the remote boot process completed within a LAN to enable a host computer to complete a remote boot process from a boot server located across the IB network. There is presently no Open Firmware support to seamlessly perform a network boot operation via the standard network boot process of a network device connected to an IB fabric, where the boot device is connected directly to the IB fabric or to an external network coupled to an end node of the IB fabric.

SUMMARY OF THE INVENTION

Disclosed is a method and system for enabling an InfiniBand (IB) host computer device to boot an operating system from a remote boot device over the IB network. The device's firmware is enhanced to provide a representation of an IB Host Channel Adapter (HCA) within the hierarchical data structure that represents the computer device's hardware. Accordingly, a new device type is defined, the "hca" device type, which represents an IB HCA. The hca device is characterized in the hierarchical firmware data structure by a node global unique identifier (node-GUID). The hca device contains interfaces to open and close the device and read from and write to the device. The "hca" device includes several "children", which are referred to as "ibport" devices and are identified by the port global unique identifier (port-GUID). In addition to the open, close, read, and write interfaces defined for the parent hca device, an ibport device includes a load interface to enable the device to be used as a boot device.

An "ib-boot" support package is created to assist in encapsulating arguments for booting over an IB network using an ibport device, and a set of boot arguments is defined to be utilized by the ib-boot support package. The ib-boot support package processes the boot arguments that specify the target IB end node and one or more keywords. In one embodiment, the ib-boot support package also implements specific packet transfer protocols, typically utilized by hca device drivers, which are utilized when booting over an IB.

The hierarchical nature of the firmware structure is utilized to pass these IB-specific arguments, based on the specified keyword, to the appropriate support package to complete the boot processing. In one embodiment, two keywords are provided, each identifying a specific one of a network support package and a Sockets Direct Protocol (SDP) support package. The first keyword specifies that the IPoIB (Internet Protocol (IP) over IB) network boot method is to be implemented, whereby the IPoIB network protocol is used to get to the boot server and find the boot file. The second keyword specifies that the IB network boot method is to be implemented, whereby the SDP network protocol is used to access the boot device. Access to the boot server is thus provided via one of the support packages and the boot image is returned to the host device via the IB network for completion of the boot operation.

The above as well as additional objectives, features, and advantages of the present invention will become apparent in the following detailed written description.

BRIEF DESCRIPTION OF THE DRAWINGS

The invention itself, as well as a preferred mode of use, further objects, and advantages thereof, will best be understood by reference to the following detailed description of an illustrative embodiment when read in conjunction with the accompanying drawings, wherein.

DETAILED DESCRIPTION OF AN ILLUSTRATIVE EMBODIMENT

The present invention provides a method and system for enabling an InfiniBand (IB) host computer device to boot an operating system from a remote boot device over the IB network. The device's firmware is enhanced to provide a representation of an IB Host Channel Adapter (HCA) within the hierarchical data structure that represents the computer device's hardware. An "ib-boot" support package is provided to assist in encapsulating arguments for booting over an IB network using an ibport device, and a set of boot arguments is defined to be utilized by the ib-boot support package. The ib-boot support package processes the boot arguments that specify the target IB end node and one or more keywords.

The hierarchical nature of the firmware structure is utilized to pass these IB-specific arguments, based on the specified keyword, to the appropriate support package to complete the boot processing. In one embodiment, two keywords are provided, each identifying a specific one of a network support package and a Sockets Direct Protocol (SDP) support package. The booting platform uses the IB fabric to either connect to a LAN NIC to get access to a boot server in the LAN or to an end node in the IB fabric. The first keyword specifies that the IPoIB (Internet Protocol (IP) over IB) network boot method is to be implemented, whereby the IPoIB network protocol is used to get to the boot server and find the boot file. The second keyword specifies that the IB network boot method is to be implemented, whereby the SDP network protocol is used to connect to the boot server in the IB fabric and find the boot file. Access to the boot server is thus provided via one of the support packages and the boot image is returned to the host device via the IB network for completion of the boot operation.

In the following detailed description of exemplary embodiments of the invention, specific exemplary embodiments in which the invention may be practiced are described in sufficient detail to enable those skilled in the art to practice the invention, and it is to be understood that other embodiments may be utilized and that logical, architectural, programmatic, mechanical, electrical and other changes may be made without departing from the spirit or scope of the present invention. The following detailed description is, therefore, not to be taken in a limiting sense, and the scope of the present invention is defined only by the appended claims.

Within the descriptions of the figures, similar elements are provided similar names and reference numerals as those of the previous figure(s). Where a later figure utilizes the element in a different context or with different functionality, the element is provided a different leading numeral representative of the figure number (e.g., 1xx for FIG. 1 and 2xx for FIG. 2). The specific numerals assigned to the elements are provided solely to aid in the description and not meant to imply any limitations (structural or functional) on the invention.

It is also understood that the use of specific parameter names are for example only and not meant to imply any limitations on the invention. The invention may thus be implemented with different nomenclature/terminology utilized to describe the above parameters, without limitation.

Figure 1:
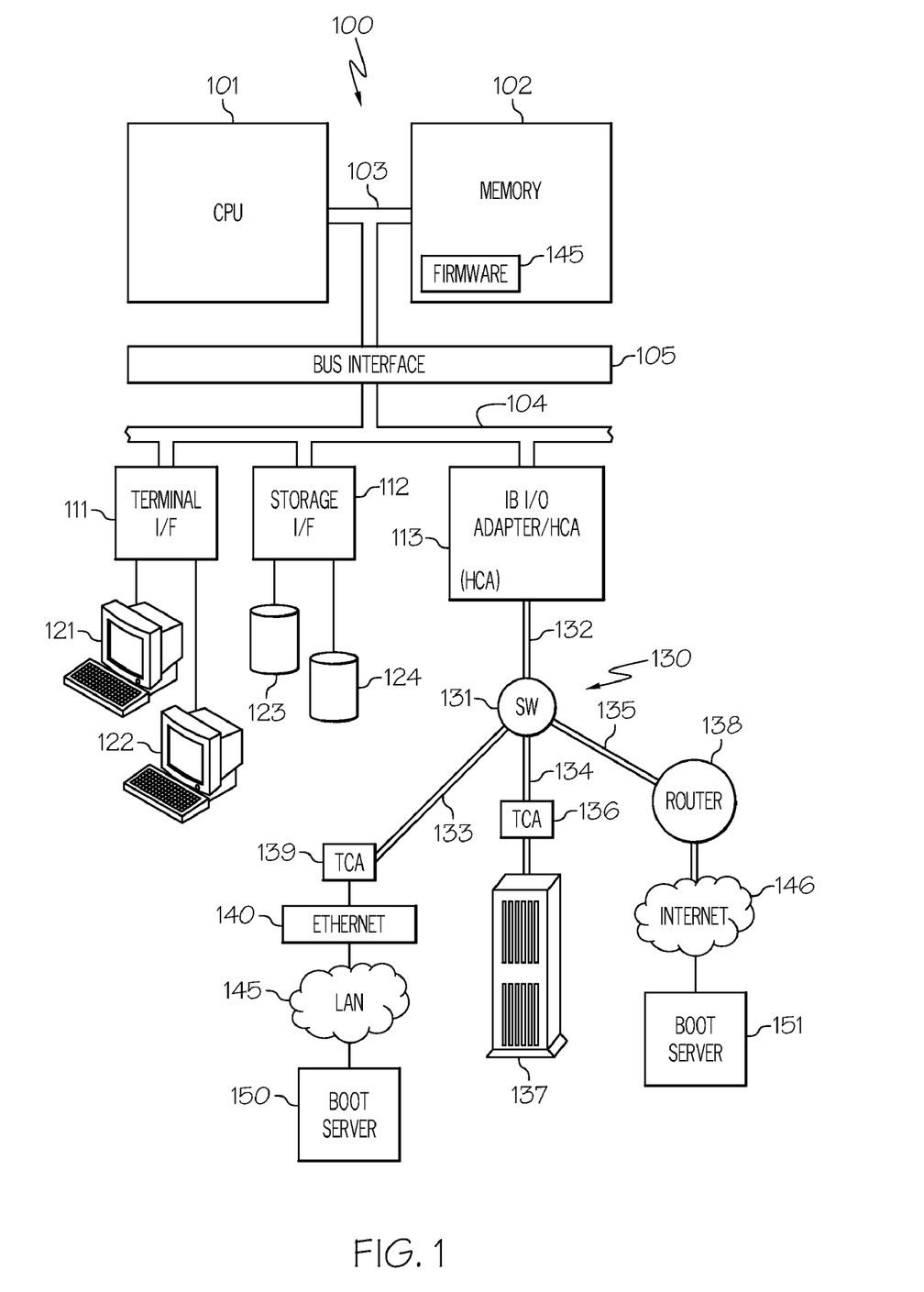
FIG. 1 is a high-level block diagram of the major hardware components of a host computer device within an InfiniBand (IB) network, according to one embodiment of the present invention.

With reference now to the figures, FIG. 1 provides a high-level representation of the major hardware components of a networked computer system utilizing an InfiniBand (IB) network connection for communicating with various peripheral and networked devices, including one or more remote boot servers, according to the described embodiments of the present invention. As shown, computer system 100, which is interchangeably referred to herein as the host computer or host computer device within the IB network, comprises central processing unit (CPU) 101 coupled to memory 102 via memory bus 103, which in turn provides connection to various other peripheral or network devices via input/output (I/O) bus interface 105. CPU 101 is a general-purpose programmable processor which executes instructions and processes data from main memory 102. Main memory 102 may be a dynamic random access memory (DRAM) in which data is loaded from storage (123/124) for processing by CPU 101.

Memory bus 103 provides a data communication path for transferring data between CPU 101, main memory 102 and I/O bus interface 105. I/O bus interface 105 is further coupled to system I/O bus 104 for transferring data to and from various I/O units. I/O bus interface 105 communicates with multiple I/O interface units 111-113, which are also known as I/O processors (IOPs) or I/O adapters (IOAs), through system I/O bus 104. System I/O bus 104 may be an industry standard PCI bus or any other appropriate bus technology. The I/O interface units support communication with a variety of storage and I/O devices. For example, terminal interface unit 111 supports the attachment of one or more user terminals 121-122. Storage interface unit 112 supports the attachment of one or more direct access storage devices (DASD) 123-124 (which may represent a redundant array of independent disks (RAID) memory, configured to appear as a single large storage device to a host computer). Various other types of I/O devices (not shown) may be attached to I/O interface units, such as tape drives, printers, and network transceivers.

According to one embodiment of the invention, one of the I/O interface units is IB I/O adapter/HCA 113, which is interchangeably referred to herein as the host channel adapter (HCA) since IB I/O adapter/HCA 113 enables host computer 100 to connect to the IB network. The HCA is a programmable DMA (direct memory access) engine, which generates and consumes packets.

IB I/O adapter 113 supports a connection to InfiniBand network 130, which comprises switch 131 and multiple point-to-point connections 132-135. The InfiniBand network is a local network which may be used to connect to a variety of devices. As illustrated, InfiniBand network 130 provides connection to other computer systems, such as IB-boot server 137, which is coupled to switch 131 via target channel adapter (TCA) 136. InfiniBand network 130 also provides connection to routers or adapters, which in turn couple InfiniBand network 130 to other local or wide area networks. In the exemplary embodiment of FIG. 1, TCA 139 connects to local area network (LAN) 145 via Ethernet adapter 140. LAN 145 provides access to remote boot server 150. Also, router 138 connects to Internet 140, which provides access to second remote boot server 151. As provided herein, the components of computer system 100, apart from InfiniBand I/O adapter (HCA) 113 and the connected IB network 130, are also referred to herein as the "host computer", to distinguish the host device that requires a boot OS from a boot server located across IB network 130. As illustrated, two external networks are provided, namely LAN 145 and Internet 140. Access by host device 100 to Internet 140 and LAN 145 are described as occurring at an "end node" of IB network 130, such as TCA 139.

Although IB network 130 is shown in FIG. 1 having a single switch 131 and four connections 132-135 to respective digital devices, it is understood that an IB network may have a different number of switches, adapters, routers and links (but may have no switches or routers). The topology of an IB network may be considerably different and more complex, and thus a different number or types of devices may be coupled to an IB network.

It should be understood that FIG. 1 is intended to depict the representative major components of computer system 100 at a high level and that individual components may have greater complexity that represented in FIG. 1. It is further appreciated that components other than or in addition to those shown in FIG. 1 may be present, and that the number, type and configuration of such components may vary. FIG. 1 is thus presented solely by way of example and not intended to imply any limitations on the invention.

The present invention enables a remote boot process for computer device 100 connected to IB network 130 via a boot process occurring across IB network 130. In one embodiment, two different methods of completing a network boot process are supported over the IB fabric, namely (a) a LAN-type network boot and (b) an IB network boot. The LAN-type network boot method involves connecting to a boot server located in a LAN attached to a remote IB end node and using Transmission Control Protocol/Internet Protocol (TCP/IP) commands sent over the IB fabric (referred to herein as IPoIB). The IB network boot method involves connecting to a boot server located in/at a remote IB end node and using a transport protocol such as Sockets Direct Protocol (SDP) to obtain the boot file.

Additionally, as described in related application Ser. No. 11/678,133, a storage boot method may be supported by the computer device 100 within the overall implementation of remote boot operations. The storage boot method involves connecting to a storage device attached to a remote IB node directly or through a storage area network (SAN) and sending storage protocol commands, such as the SCSI (Small Computer System Interface) RDMA (Remote Direct Memory Access) Protocol (SRP), over the IB fabric. The specifics of this implementation are provided in detail within the related application, relevant content of which is previously incorporated herein by reference.

Within the above example computer system and network environment, a first aspect of the invention involves modifying the system firmware to enable the firmware to identify and represent IB end nodes within the hierarchical structure generated by system firmware during system initialization in a way that enables the IB end nodes to be used for booting operations. Following power-on (or reboot) of a computer system, the system undergoes a boot process by which the system's firmware prepares the system for operation by identifying and setting up/initiating devices in the system. During the boot process, the firmware represents system hardware as a hierarchy of interconnected buses with attached devices. This hierarchical representation describes user configuration choices, and contains firmware device drivers for hardware devices and support routines for use by those drivers.

Within an IB network, in one embodiment of the invention, the host system's boot firmware is enhanced to recognize the presence of the IB HCA and one or more IB-end node devices. According to one embodiment, a new device type is defined as the "hca" device type, which represents an IB HCA. The hca device is characterized in the hierarchical firmware data structure by a node global unique identifier (node-GUID). The hca device contains interfaces to open and close the device and read from and write to the device. The hca device includes several "children", which are referred to as "ibport" devices and are identified by the port global unique identifier (port-GUID). In addition to the open, close, read, and write interfaces defined for the parent hca device, an ibport device includes a load interface to enable the device to be used as a boot device.

A second related aspect of the invention involves the creation and utilization of command/qualifier keywords that are added to the boot arguments generated by system firmware during system initialization. The command keyword specifies a packet transfer protocol and an associated set of arguments. These command keywords are understood by the ib-boot support package, which receives the boot arguments from the system firmware. In one embodiment of the invention, a specific network boot method is selected by using a command keyword in the arguments of the open interface for the ib-boot support package. The command keywords modify the boot arguments associated with a bootstrap method by specifying a specific network boot method to be undertaken. According to one embodiment, the command keyword is the first argument in the boot arguments, and only one command keyword may be specified at a time. As further described below, these command keywords are mutually exclusive, and thus, only one of the qualifier keywords is added before the standard boot arguments to enable IB-level remote boot operations. If more than one command keyword is specified, a failure results with a warning message sent to the user of the host computer device, and the device does not open.

Thus, in the illustrative embodiment of the invention, the following two command keywords are created, with their corresponding definitions provided:

(a) ipoib: which specifies the IPoIB network boot method. When ipoib is specified, the IPoIB network protocol is used to access the boot server and find the boot file. The booting platform uses the IB fabric to connect to a LAN NIC (network interface card) to obtain access to a boot server in the LAN; and (b) sdp: which specifies the IB network boot method. When sdp is specified, the SDP network protocol is used to access a boot server in the IB fabric.

Within the above boot arguments, the IB specific arguments and their descriptions include:

(a) iocguid=IOC-GUID: which is a 64-bit globally unique EUI-64 compliant identifier that identifies the target I/O controller or I/O unit; and (b) portgid=IOC-GID: which is a 128-bit number that identifies a port in the target I/O unit. The argument is expressed in IPv6 format and the argument is made out of a 64-bit GID prefix and the 64-bit port GUID assigned to the I/O controller.

As provided herein, IOC-GUID and IOC-GID uniquely identify the end node in the InfiniBand fabric. The ib-boot process establishes a connection with the target I/O controller or end node and then utilizes the protocol specified through the command keywords to send packets over the IB transport. Examples of the network-related arguments (network-args) are described in related patent application Ser. No. 11/678,133, previously incorporated herein by reference.

As described in detail below, one embodiment of the invention operates with an enhanced network support package, which supports addition to the boot arguments of qualifier keyword(s), such as ipv6 and dhcp. The ipv6 keyword is optionally added before the first boot argument to indicate that any/all network addresses provided within the boot arguments are expressed using the IPv6 format. Since IB networks transmit addresses in IPv6 format, the ipv6 keyword may be assumed as the default address format when command keyword IPoIB is provided with the boot arguments.

A third aspect of the invention involves utilizing an ib-boot support package to enable seamless connection to either the IPoIB network boot process or the SDP network boot process from a remote boot device. The ib-boot support package implements specific packet transfer protocols, typically utilized by hca device drivers, which are utilized when booting over an IB.

The ib-boot support package assists in encapsulating arguments for booting over an IB network using an ibport device, and a set of boot arguments is defined to be utilized by the ib-boot support package. The ib-boot support package processes the boot arguments that specify the target IB end node (i.e., a TCA or router or adapter coupled to the IB fabric and to which the boot server connects, either directly or via a network). In one embodiment, the ib-boot support package also implements specific packet transfer protocols, typically utilized by hca device drivers, which are utilized when booting over an IB.

The hierarchical nature of the firmware structure is utilized to pass these IB-specific arguments, based on the specified keyword as processed by the ib-boot support package, to the appropriate support package to initiate retrieval of the boot image. In one embodiment, two keywords are provided, each identifying a specific one of a network support package and a Sockets Direct Protocol (SDP) support package. The booting platform uses the IB fabric to either connect to a LAN NIC to get access to a boot server in the LAN or to an end node in the IB fabric. The first keyword specifies that the IPoIB network boot method is to be implemented, whereby the IPoIB network protocol is used to get to the boot server and find the boot file. The second keyword specifies that the IB network boot method is to be implemented, whereby the SDP network protocol is used to connect to a boot server in the IB fabric using the SDP.

Thus, depending on the keyword provided with the boot arguments, the ib-boot support package may pass the boot arguments to a network support package to complete a network boot method. Alternatively, the ib-boot support package may pass the boot arguments to an SDP support package to complete an IB-network boot. According to one embodiment, the boot arguments for an IPoIB boot are as follows:

open ibport-device: iocguid=IOC-GUID, portgid=IOC-GID, ipoib, network-args

When the boot arguments specify the IPoIB network boot method, the ib-boot support package processes the IB-specific boot arguments and transfers network-related arguments to the network support package.

Figure 2:
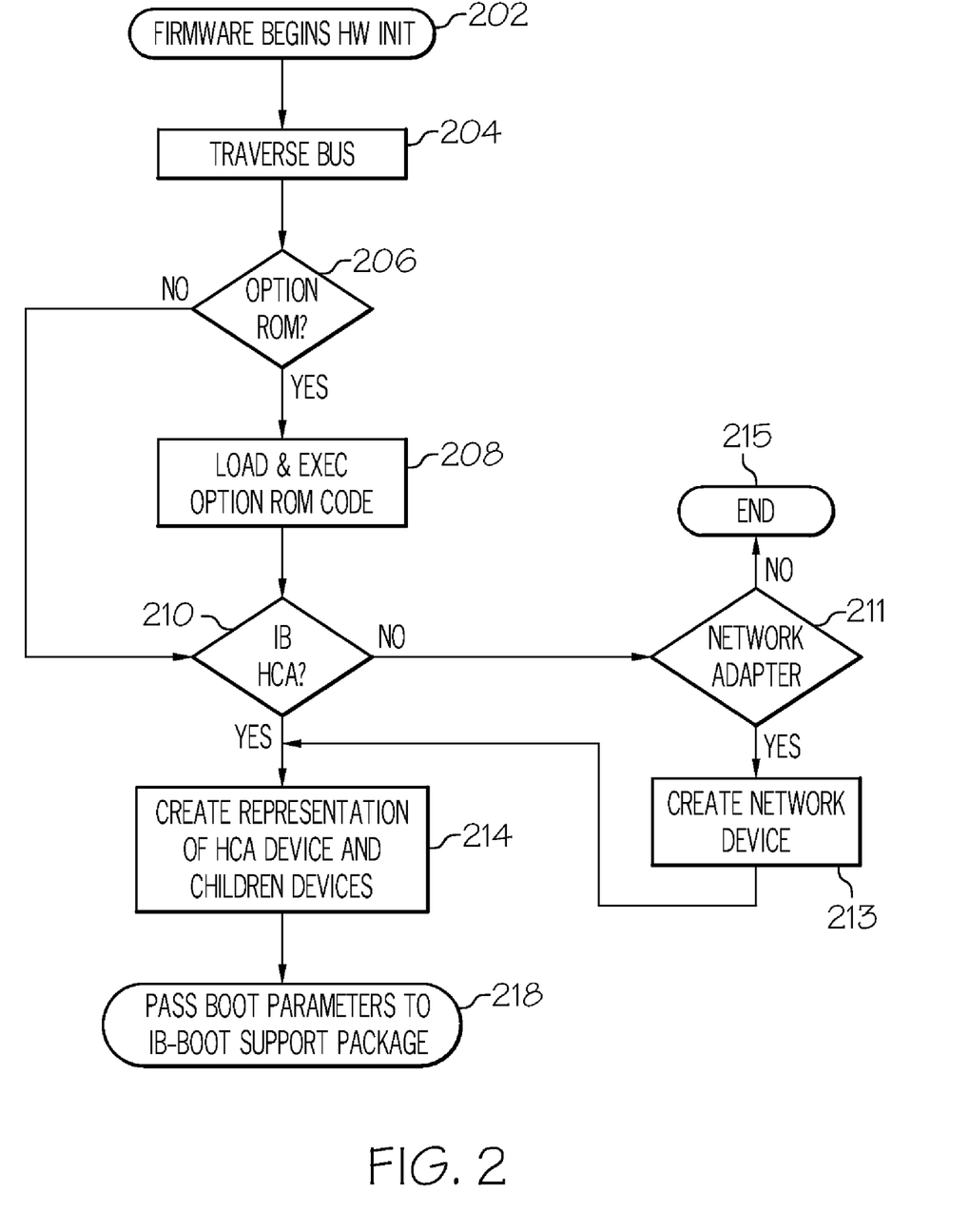
FIG. 2 illustrates an example process flow by which the IB Host Channel Adapter (HCA) is represented within the firmware generated hierarchical structure and boot parameters are transferred to the ib-boot support package, in accordance with an illustrative embodiment of the invention.

FIG. 2 is a flow chart depicting the process by which the system firmware discovers the IB HCA and represents the device and its children within the hierarchical topology, according to one embodiment of the invention. The processes of FIG. 2 are described with reference to the system components as shown in FIG. 1. The process begins at block 202, at which hardware initialization is initiated on a host system such as host system 100 (FIG. 1) by firmware such as system firmware 145 (FIG. 1). During system initialization, system firmware 145 traverses the system buses and identifies the I/O topology of host system 100, as shown at block 204. If, at decision block 206, an option ROM is detected in any of the devices attached to the bus, the option ROM is loaded and its code executed, as shown at block 208. As a result of executing the code, a representation of the device is created and added to the main hierarchical I/O topology, as shown at block 214.

If, at decision block 206, an option ROM is not detected, system firmware 145 determines at block 210 whether an IB HCA (or "hca" device) is detected. If an IB HCA device is detected, system firmware 145 creates a representation of the hca device along with its children ibport devices, as shown at block 214. System firmware 145 also creates a device representation of the location of the ibport devices within the I/O topology, as indicated at block 214. Because an "ibport" device is opened with a specific set of boot arguments, system firmware 145 obtains the boot arguments required to open the ibport devices. System firmware then passes the boot arguments to the ib-boot support package for processing, as indicated at block 218.

Figure 3:
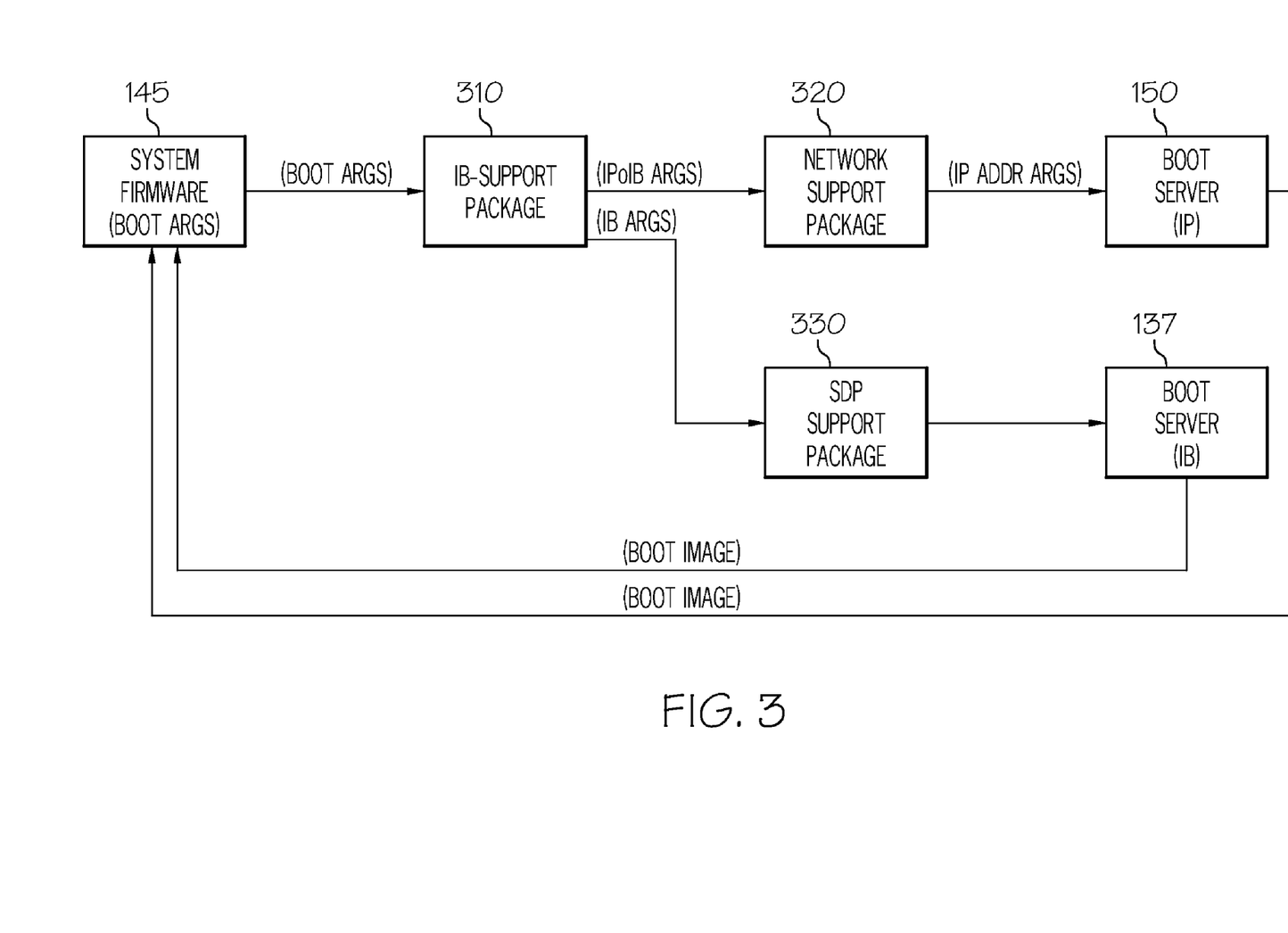
FIG. 3 is a block diagram illustrating interconnected functional components (hardware, firmware, and software structure) that collectively enable remote booting over an IB network as that provided by FIG. 1, according to one embodiment of the invention.

Turning now to FIG. 3, which provides a block diagram representation of an example system, with primary components (hardware and software utility) that enable the utilization of IB boot arguments by an IB boot support package to enable IBoIP boot or SDP boot from a remote boot device, according to one illustrative embodiment of the invention. As shown, system firmware 145 of the device being booted, e.g., host system 100 (FIG. 1) is communicatively coupled to ib-boot support package 310. The ib-boot support package establishes a connection with the target I/O controller specified in the boot arguments. When booting from an IB-connected boot device, ib-boot support package 310 transmits SDP boot arguments to SDP support package 330, which utilizes SDP network protocol to get the boot file from boot server 137 (FIG. 1). When booting from a server connected via an IP network, ib-boot support package 310 forwards the IPoIB boot arguments to enhanced network support package 320.

Network support package 320 is in turn communicatively coupled to boot server 150 (FIG. 1) via an IP network. According to one embodiment, network support package 220 is further connected to a plurality of other servers, such as a DCHP server(s) and a BOOTP server (not specifically shown), which servers represent the collective of different server types that may be accessed by corresponding discovery protocols to obtain additional parameters/arguments required for accessing boot server 150.

IP boot server 150 and IB boot server 137 (FIG. 1) are capable of providing the boot image to system firmware 145 of computer system 100 to enable computer system 100 to complete a boot operation. Servers 150 and 137 receive respective sets of boot arguments from network support package 320 and SDP support package 330, respectively. However, network support package 320 receives the arguments via IPoIB messages and transmits IPoIB messages, which is a different type/format of message transmission than that supported by SDP support package 330, namely IB messages.

According to the illustrative embodiment, enhanced network support package 320 is provided a mechanism that enables network support package 320 to receive boot arguments that comprise keywords, including ipv6 and dchp, since IB operates via IPv6 addressing format. More specifically, enhanced network support package 320 provides support for IPv6 address format and enables retrieval of the boot image via IPoIB messages. The method by which network support package 320 is enabled to utilize IPv6 address format is described in greater detail in related patent application Ser. No. 11/678,132, which has been previously incorporated herein by reference.

Figure 4:
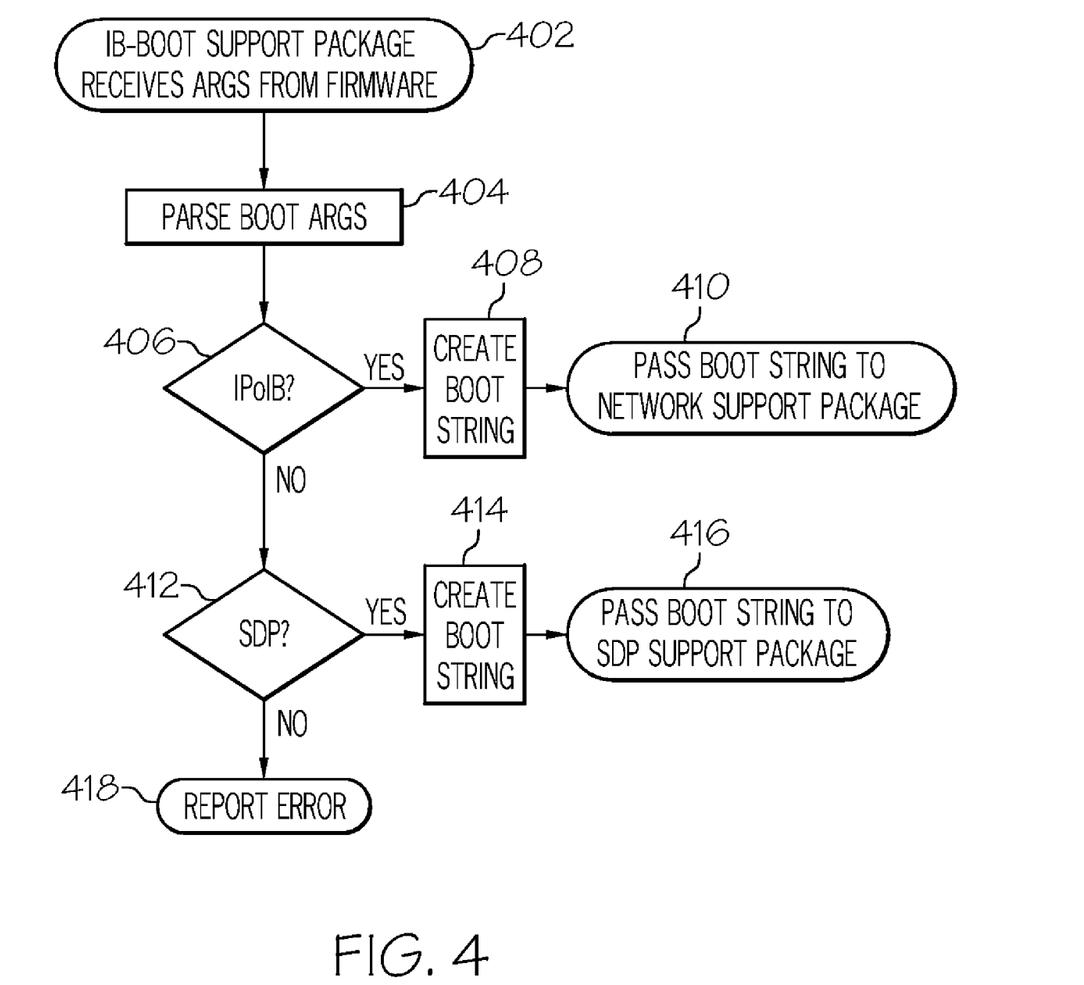
FIG. 4 illustrates an example process flow by which ib-boot support package processes boot arguments and selects a network support package or a SDP support package to forward the boot arguments for completion of the remote boot processing, in accordance with one embodiment of the invention.

FIG. 4 depicts the flow of boot arguments between the ib-boot support package and the other two support packages, selected depending on the command keyword included within the boot arguments. The ib-boot support package provides the boot arguments that specify the target IB end node. The hierarchical nature of the firmware structure is utilized to pass these IB-specific arguments to the appropriate support package to complete the boot processing. The process begins at block 402 which illustrates the ib-boot support package receiving the boot arguments from system firmware. The ib-boot support package parses the boot arguments as shown at block 404, and determines at block 406 if the arguments indicate an IPoIB boot operation. If an IPoIB boot is indicated, the ib-boot support package creates the boot string for an IPoIB boot, as provided at block 408, and then the created boot string in forwarded to network support package 320 (FIG. 3), as shown at block 410. Thus, if the IBoIP network method is selected, the ib-boot package transfers control to network support package 320 and all the network structures are leveraged by the ib-boot support package.

If the boot arguments do not indicate an IPoIB boot, then a next determination is made at block 412 of whether the boot arguments indicate an SDP boot. If an SDP boot is indicated, the ib-boot support package generates the boot string required for an SDP boot, as shown at block 414, and the generated boot string is forwarded to the SDP boot support package, as depicted at block 416. Thus, when the IB network method is selected, the ib-boot support package transfers control to the SDP support package or any other package that facilitates or provides direct file transport protocols over InfiniBand links. Otherwise, if neither an IPoIB nor a SDP boot is indicated by the boot arguments, an error is reported, as shown at block 418, and the boot process ends.

Figure 5:
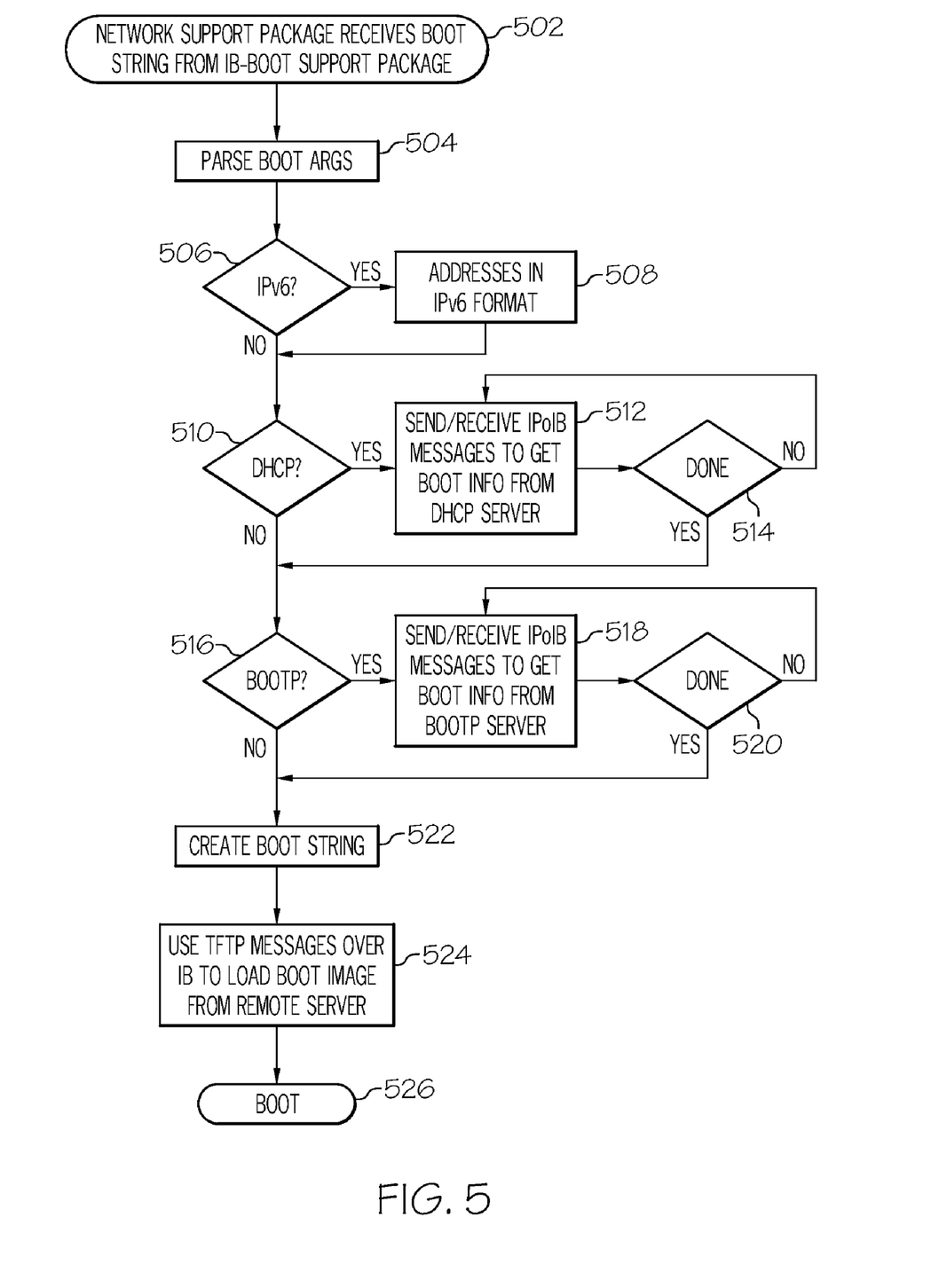
FIG. 5 illustrates an example process flow by which the network support package processes boot arguments received from the ib-boot support package and implements the series of processes to access the appropriate discovery server to obtain additional boot parameters for accessing the boot device, according to one illustrative embodiment of the invention.

FIG. 5 is a flow chart depicting the processing of the boot arguments as performed by network support package 320, when transmission of TCP/IP messages over IB links (IPoIB) is utilized to load a boot file from a LAN server (such as boot server 150 of FIG. 1), according to one embodiment of the invention. Through the hierarchical nature of the I/O topology representation, read and write operations performed by the network support package are passed through to ib-boot support package 310 and are actually performed by the HCA device (such as HCA device 113 of FIG. 1). HCA 113 encapsulates TCP/IP commands and sends the commands to the specified IB target node (such as TCA 141 of FIG. 1) via IB links (e.g., 133 of FIG. 1). If the target of the TCP/IP commands is not the target IB node, the LAN driver in the target IB node forwards the packets to the appropriate destination (e.g., boot server 150) within LAN 145 (FIG. 1).

The process begins at block 502, which illustrates enhanced network support package, such as network support package 320 of FIG. 3, receiving the boot arguments (from ib-boot support package 320 of FIG. 2). Enhanced network support package 220 parses the boot arguments, as shown at block 504 and determines at block 506 if the boot arguments contain keyword ipv6. When the keyword ipv6 is contained within the boot arguments, network support package 320 configures all addressing functions to support addresses in IPv6 format, as provided at block 508.

Then, at block 510, network support package 320 determines whether the boot arguments contain the keyword dhcp. If keyword dhcp is contained within the boot arguments, network support package 320 sends and receives IPoIB messages to obtain the boot information (i.e., addressing and other parameters) from a DHCP server, as shown at block 512. Keyword dhcp may have an argument 'diaddr', which directs enhanced network support package 320 to the exact DHCP server from which the boot server addresses and other parameters are to be obtained. Alternatively, when no arguments are provided with keyword dhcp, network support package 320 issues a broadcast to find a DHCP server on the network.

Following a determination at block 514 that the retrieval of the boot parameters from DHCP server is complete, (or when dhcp is not included within the boot arguments), network support package 320 determines, at block 516, whether or not a bootstrap process (bootp) is indicated within the boot arguments. When bootp is one of the boot arguments (i.e., following one or both of the above keywords or without either keyword being present within the boot arguments), network support package 320 retrieves the addressing and other parameters from the BOOTP server as a bootstrap operation utilizing IPoIB messages, as illustrated at block 518. Once the bootstrap operation is complete, as determined at decision block 520 (or if no bootstrap argument is included within the boot arguments, network support package 320 generates/creates a boot string, as shown at block 522. Network support package 320 then utilizes TFTP messages over IB to load the boot image from remote server, as shown at block 524. The firmware then completes the boot process at computer system 100 (FIG. 1), as indicated at block 526.

Figure 6:
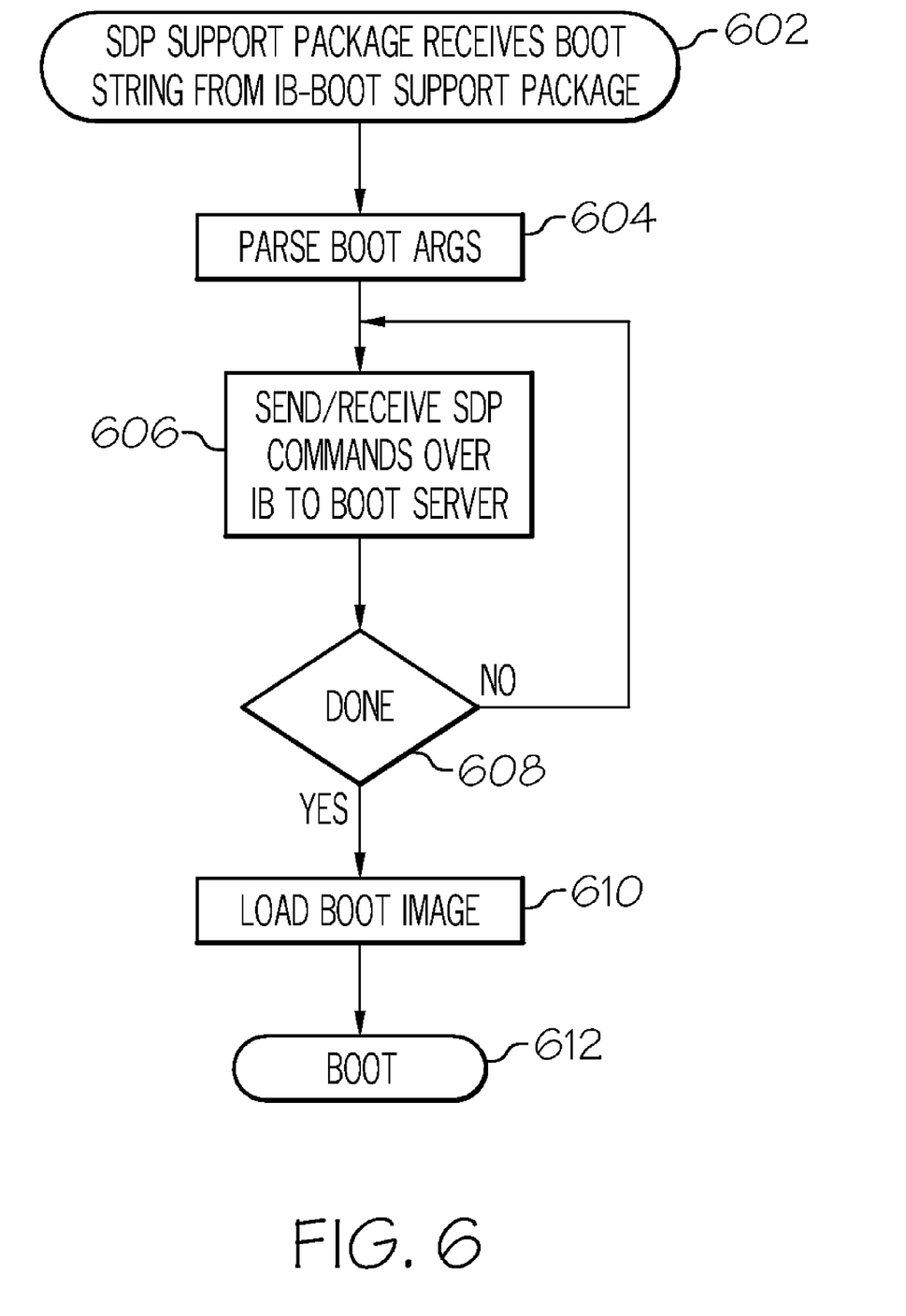
FIG. 6 is a flow chart illustrating the process by which the SDP package processes the boot arguments received from the ib-boot support package to complete loading of a boot image from a boot server via an IB end node, in accordance with an illustrative embodiment of the invention.

FIG. 6 is a flow chart depicting the processing of boot arguments as performed by an SDP support package such as SDP support package 330 of FIG. 3, when the SDP protocol is utilized to load a boot file from an IB end node (e.g., server 137 of FIG. 1). Through the hierarchical nature of the I/O topology representation, read and write operations performed by the SDP support package are passed through to the ib-boot support package and are actually performed by the HCA device. The HCA device encapsulates SDP messages and sends the messages to the specified IB target node via IB links.

The process begins at block 602, which illustrates SDP support package 330 receiving the ib-boot arguments from ib-boot support package 210. SDP support package 330 parses the boot arguments, as shown at block 604, and then sends the SDP commands over IB to boot server (such as boot server 137 of FIG. 1), as indicated at block 606. A determination is made at block 608 whether transmission of the SDP commands have been completed, and when the transmission has been completed, boot server 137 provides the boot image, which is loaded on the host computer 100 (FIG. 1), as shown at block 610. Then, the boot operation is undertaken and completed at host computer 100, as indicated at block 612.

As a final matter, it is important that while an illustrative embodiment of the present invention has been, and will continue to be, described in the context of a fully functional computer system with installed software, those skilled in the art will appreciate that the software aspects of an illustrative embodiment of the present invention are capable of being distributed as a program product in a variety of forms, and that an illustrative embodiment of the present invention applies equally regardless of the particular type of signal bearing media used to actually carry out the distribution. Examples of signal bearing media include recordable type media such as floppy disks, hard disk drives, and CD ROMs.

While the invention has been particularly shown and described with reference to a preferred embodiment, it will be understood by those skilled in the art that various changes in form and detail may be made therein without departing from the spirit and scope of the invention.

What is claimed is:

1. In an InfiniBand (IB) network environment, a method for retrieving a boot image for an IB host device comprising:
   receiving a set of boot arguments including a command keyword;
   determining whether the command keyword is a first keyword, wherein the first keyword triggers utilization of a corresponding first support package that enables communication with a first boot server via an Internet Protocol (IP) over IB (IPoIB) boot method;
   when the command keyword is the first keyword, automatically forwarding first-type boot arguments to the first support package, which is configured to respond to receipt of the first-type boot arguments by dynamically initiating access to the first boot server to retrieve the boot image;
   determining whether the command keyword is a second keyword, wherein the second keyword triggers utilization of a second support package that enables communication with a second boot server via an IB network boot method; and
   when the command keyword is the second keyword, automatically forwarding second-type boot arguments to the second support package, which is configured to respond to receipt of the second-type boot arguments by dynamically initiating access to the second boot server to retrieve the boot image.

2. The method of claim 1, wherein:
   the first keyword is ipoib, which specifies the IPoIB boot method and the first support package is a network support package which utilizes IPoIB to access the first boot server; and
   said second keyword is sdp, which specifies the IB network boot method and the second support package is a Sockets Direct Protocol (SDP) support package, which utilizes an SDP network protocol to access the second boot server in an IB fabric.

3. The method of claim 1, further comprising establishing a connection with one of a target Input/Output (I/O) controller and a target I/O unit specified in the boot arguments.

4. The method of claim 3, wherein when the command keyword is the first keyword, said method further comprises:
   parsing the boot arguments for first arguments corresponding to the first keyword, wherein the first arguments uniquely identify an end node;
   establishing a connection with one of the target I/O controller and the end node; and
   initiating transfer of packets over an IB transport utilizing an IPoIB protocol.

5. The method of claim 1, further comprising:
   on determination of one of the first keyword and the second keyword being present within the set of boot arguments, generating a corresponding string of boot arguments and parameters for accessing a respective boot server, said arguments being utilized by a specific one of the first and second support packages that is triggered by the command keyword; and
   forwarding the corresponding string of boot arguments and parameters to the specific one of the first and second support packages identified by the command keyword.

6. The method of claim 1, further comprising:
   defining boot arguments for the host device during system initialization, wherein a hierarchical representation of system components is generated having therein a representation of an IB HCA device along with children ibport devices identifying a location at which the boot image is located;
   extending the boot arguments with one of the first keyword and the second keyword to create the set of boot arguments, said first keyword indicating the IPoIB boot method via IPoIB and the second keyword indicating the IB network boot method; and
   forwarding the set of boot arguments to an ib-boot support package to trigger selection of an appropriate boot method and initiate retrieval of the boot image via the appropriate boot method;
   wherein the ib-boot support package generates boot arguments that specify the target IB end node;
   wherein the ib-boot support package implements specific packet transfer protocols, utilized by hca device drivers when booting over an IB network; and
   wherein access operations performed by the first support package are passed through the ib-boot support package and are performed by the HCA device.

7. The method of claim 6, further comprising:
   detecting an hca device type, which represents an IB HCA (host channel adapter), during system initialization;
   characterizing the hca device type with a node global unique identifier (node-GUID); and
   representing an ibport device within the hierarchical representation, wherein the ibport device includes a load interface to enable the ibport device to be utilized as a boot device;
   wherein the ib-boot support package encapsulates TCP/IP commands and SDP messages so the HCA can transmit the commands and messages to a specified IB target node via IB links;
   wherein, when the target of the TCP/IP commands is not the target IB node, a LAN driver in the target IB node forwards the packets to an appropriate destination adapter.

8. An InfiniBand (IB) host device configured to retrieve a boot image, comprising:
   means for coupling to a host channel adapter (HCA) of an IB network;
   means for receiving a set of boot arguments including a command keyword;
   means for determining whether the command keyword is a first keyword, wherein the first keyword triggers utilization of a first support package that enables communication with a first boot server via an Internet Protocol (IP) over IB (IPoIB) boot method to connect to the first boot server;

when the command keyword is the first keyword, means for automatically forwarding first-type boot arguments to the first support package, which is configured to respond to receipt of the first-type boot arguments by dynamically initiating access to the first boot server to retrieve the boot image;

means for determining whether the command keyword is a second keyword, wherein the second keyword triggers utilization of a second support package that enables communication with a second boot server via an IB network boot method; and when the command keyword is the second keyword, means for automatically forwarding second-type boot arguments to the second support package, which is configured to respond to receipt of the second-type boot arguments by dynamically initiating access to the second boot server to retrieve the boot image.

9. The IB host device of claim 8, wherein:

the first keyword is ipoib, which specifies the IPoIB boot IB host device and the first support package is a network support package which utilizes IPoIB to access the first boot server; and said second keyword is sdp, which specifies the IB network boot IB host device and the second support package is a Sockets Direct Protocol (SDP) support package, which utilizes an SDP network protocol to access the second boot server.

10. The IB host device of claim 8, further comprising:

means for establishing a connection with one of a target Input/Output (I/O) controller and a target I/O unit specified in the boot arguments; and wherein when the command keyword is the first keyword, said IB host device further includes:

means for parsing the boot arguments for first arguments corresponding to the first keyword;

wherein the first arguments uniquely identify an end node in an IB fabric;

means for establishing a connection with one of the target I/O controller and the end node; and means for initiating transfer of packets over an IB transport utilizing the IPoIB protocol.

11. The IB host device of claim 8, further comprising:

on determination of one of the first keyword and the second keyword being present within the set of boot arguments, means for generating a corresponding string of boot arguments and parameters for accessing a respective boot server, said arguments being utilized by a specific one of the first and second support packages that is triggered by the command keyword; and means for forwarding the corresponding string of boot arguments and parameters to the one of the first and second support packages identified by the command keyword.

12. The IB host device of claim 8, further comprising:

means for generating boot arguments for the host device during system initialization, wherein a hierarchical representation of system components is generated having therein a representation of an IB HCA device along with children ibport devices identifying a location at which the boot image is located;

means for extending the boot arguments with one of the first keyword and the second keyword to create the set of boot arguments;

means for forwarding the set of boot arguments to an ib-boot support package to trigger selection of an appropriate boot IB host device and initiate retrieval of the boot image via the appropriate boot IB host device;

wherein the ib-boot support package processes boot arguments that specify the target IB end node;

wherein the ib-boot support package implements specific packet transfer protocols, utilized by hca device drivers when booting over an IB network; and wherein access operations performed by the first support package are passed through the ib-boot support package and are performed by the HCA device.

13. The IB host device of claim 12, further comprising:

means for detecting an hca device type, which represents an IB HCA (host channel adapter), during system initialization;

means for characterizing the hca device type with a node global unique identifier (node-GUID); and means for representing an ibport device within the hierarchical representation, wherein the ibport device includes a load interface to enable the ibport device to be utilized as a boot device;

wherein the HCA encapsulates TCP/IP commands and SDP messages and transmits the commands and messages to a specified IB target node via IB links;

wherein, when the target of the TCP/IP commands is not the target IB node, a LAN driver in the target IB node forwards the packets to an appropriate destination adapter.

14. An IB network having an IB host device configured according to claim 8 and further comprising:

a switch having links for connecting components within the IB network;

an end node connected to the switch via one of said links; and a boot device connected to the end node via one of a direct connection or a local area network (LAN) coupled to the end node.

15. A computer program product for retrieving a boot image for an IB host device comprising:

a computer readable storage medium; and program code on the computer readable storage medium that when executed provides the functions of:

receiving a set of boot arguments including a command keyword;

determining whether the command keyword is a first keyword, wherein the first keyword triggers utilization of a corresponding first support package that enables communication with a first boot server via an Internet Protocol (IP) over IB (IPoIB) boot method;

when the command keyword is the first keyword, automatically forwarding first-type boot arguments to the first support package, which is configured to respond to receipt of the first-type boot arguments by dynamically initiating access to the first boot server to retrieve the boot image;

determining whether the command keyword is a second keyword, wherein the second keyword triggers utilization of a corresponding second support package that enables communication with a second boot server via an IB network boot method; and when the command keyword is the second keyword, automatically forwarding second-type boot arguments to the second support package, which is configured to respond to receipt of the second-type boot arguments by dynamically initiating access to the second boot server to retrieve the boot image.

16. The computer program product of claim 15, wherein:
the first keyword is ipoib, which specifies the IPoIB boot method and the first support package is a network support package which utilizes IPoIB to access the first boot server;
said second keyword is sdp, which specifies the IB network boot method and the second support package is a Sockets Direct Protocol (SDP) support package, which utilizes an SDP network protocol to access the second boot server; and
said program code further comprising code for:
on determination of one of the first keyword and the second keyword being present within the set of boot arguments, parsing a corresponding string of boot arguments and parameters for accessing a respective boot server, said arguments being utilized by a specific one of the first and second support packages that is triggered by the command keyword; and
forwarding the corresponding string of boot arguments and parameters to the one of the first and second support packages identified by the command keyword.

17. The computer program product of claim 15, wherein said program code further comprises code for:
establishing a connection with one of a target Input/Output (I/O) controller and a target I/O unit specified in the boot arguments;
parsing the boot arguments for first arguments corresponding to the first keyword, wherein the first arguments uniquely identify an end node in an IB fabric;
establishing a connection with one of the target I/O controller and the end node; and
initiating transfer of packets over an IB transport utilizing an IPoIB protocol.

18. The computer program product of claim 17, further comprising program code that when executed provides the functions of:
detecting an hca device type, which represents an IB HCA (host channel adapter), during system initialization;
characterizing the hca device type with a node global unique identifier (node-GUID);
representing an ibport device within a hierarchical representation of system components, wherein the ibport device includes a load interface to enable the ibport device to be utilized as a boot device;
generating boot arguments for the host device during system initialization, wherein the hierarchical representation of system components is generated having therein a representation of an IB HCA (hca device) along with children ibport devices identifying a location at which the boot image is located;
extending the boot arguments with one of the first keyword and the second keyword to create the set of boot arguments, said first keyword indicating the IPoIB boot method and the second keyword indicating the IB network boot method; and
forwarding the set of boot arguments to an ib-boot support package to trigger selection of an appropriate boot method and initiate retrieval of the boot image via the appropriate boot method;
wherein the HCA encapsulates TCP/IP commands and SDP messages and transmits the commands and messages to a specified IB target node via IB links;
wherein, when the target of the TCP/IP commands is not the target IB node, a LAN driver in the target IB node forwards the packets to an appropriate destination adapter;
wherein the ib-boot support package generates boot arguments that specify the target IB end node;
wherein the ib-boot support package implements specific packet transfer protocols, utilized by hca device drivers when booting over an IB network; and
wherein access operations performed by the first support package are passed through the ib-boot support package and are performed by the HCA device.

* * * * *